United States Patent [19]
Jesswein

[11] 3,889,976
[45] June 17, 1975

[54] TRACTOR UNIT FOR AN ARTICULATED VEHICLE

[75] Inventor: Ronald M. Jesswein, Berrien Springs, Mich.

[73] Assignee: Clark Equipment Company, Buchanan, Mich.

[22] Filed: Mar. 21, 1974

[21] Appl. No.: 453,230

[52] U.S. Cl. ........ 280/400; 180/79.2 B; 280/415 R
[51] Int. Cl. ............................................. B60d 1/00
[58] Field of Search ........ 280/400, 432; 180/51, 52, 180/79.2 B

[56] References Cited
UNITED STATES PATENTS

| | | | |
|---|---|---|---|
| 3,130,806 | 4/1964 | Baer et al. | 180/79.2 B |
| 3,563,329 | 2/1971 | Licari | 180/51 X |
| 3,730,555 | 5/1973 | Keller | 280/432 |

Primary Examiner—Leo Friaglia
Assistant Examiner—R. Schrencengost
Attorney, Agent, or Firm—Kenneth C. Witt

[57] ABSTRACT

A tractor unit for connection to an implement unit to form a complete articulated vehicle. Different implement units may be utilized to form different types of vehicles. Some such vehicles require a different amount of articulation than others. A construction is provided whereby the amount of articulation of the vehicle can be adjusted to suit the particular implement unit being utilized.

3 Claims, 8 Drawing Figures 3,889,976

3,889,976

TRACTOR UNIT FOR AN ARTICULATED VEHICLE

CROSS REFERENCE

The tractor unit disclosed and claimed herein is of the same general type as the tractor unit of U.S. Pat. No. 3,563,329 Licari, dated Feb. 16, 1971.

BACKGROUND OF THE INVENTION

1. Field of the Invention

This invention relates to two wheel tractor units which are arranged to be connected to various implement units to form complete articulated vehicles of different types for performing a variety of operations.

2. Description of Prior Art

In such articulated vehicles it is not satisfactory always to have the same amount of articulation of the tractor portion with respect to the implement or trailing portion. By amount of articulation in this context is meant the size of the angle that the tractor unit pivots about the vertically disposed pivot axis with respect to the implement unit, or the converse, with the plane of reference being a longitudinal plane through the pivot axis when the tractor unit and implement unit are in the aligned or straight ahead position.

The object of the present invention is to provide a construction by which the angle through which the tractor unit can be pivoted to one side or the other of such longitudinal plane can be limited to a preselected amount, depending upon which implement unit is coupled to the tractor unit.

SUMMARY OF THE INVENTION

In carrying out this invention in one preferred form I provide a vehicle tractor unit which includes a body portion, a pair of drive wheels supporting the body portion, a pivotable connection portion located at one end of the body portion and retractable auxiliary wheels on the connection portion for supporting the tractor unit when it is not coupled to an implement unit. Means are provided on the connection portion for detachably connecting any one of a plurality of implement units to the tractor unit to form a variety of articulated vehicles, and structure is provided for selectively securing different maximum angles of articulation for the resulting vehicle depending on the requirements of the individual implement units.

DESCRIPTION OF A PREFERRED EMBODIMENT

Figure 1:
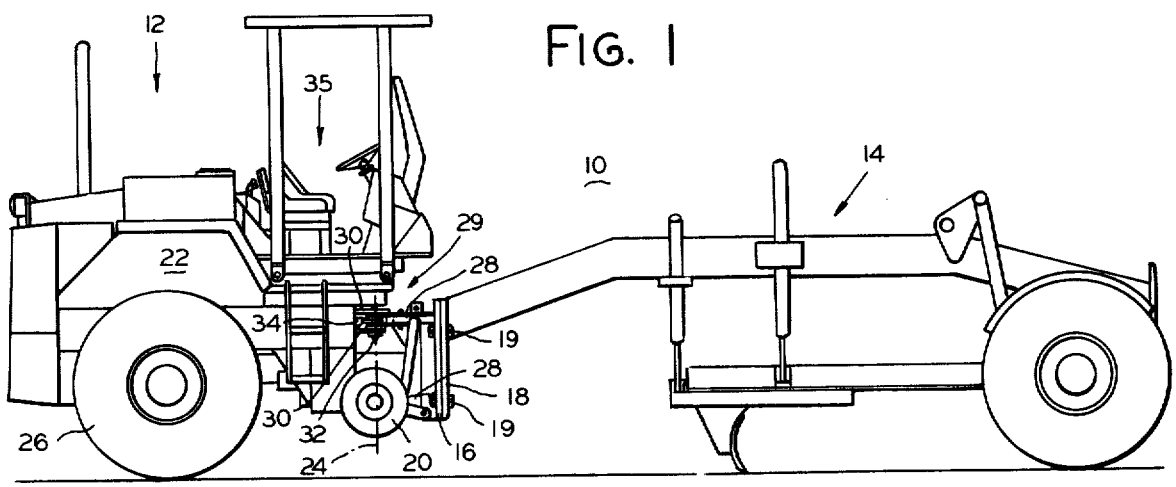
FIG. 1 is a schematic side elevational view showing a complete articulated vehicle which includes a tractor unit embodying the present invention.

Referring to FIG. 1 of the drawing, there is shown a complete articulated vehicle which is indicated generally by the numeral 10 and is composed of two separable parts, a tractor unit indicated by the numeral 12 and an implement unit indicated by the numeral 14. The implement unit illustrated is a grader implement which when coupled to the tractor unit as shown makes a complete articulated motor grader vehicle for the movement of dirt or other material by scraping and pushing. The tractor unit 12 and the implement unit 14 are detachably secured together at 16,18. That is, connection portion 16 which forms a part of the tractor unit 12 is secured by means of bolts 19 or other equivalent means to plate 18 which forms a part of the implement unit 14.

Figure 2:
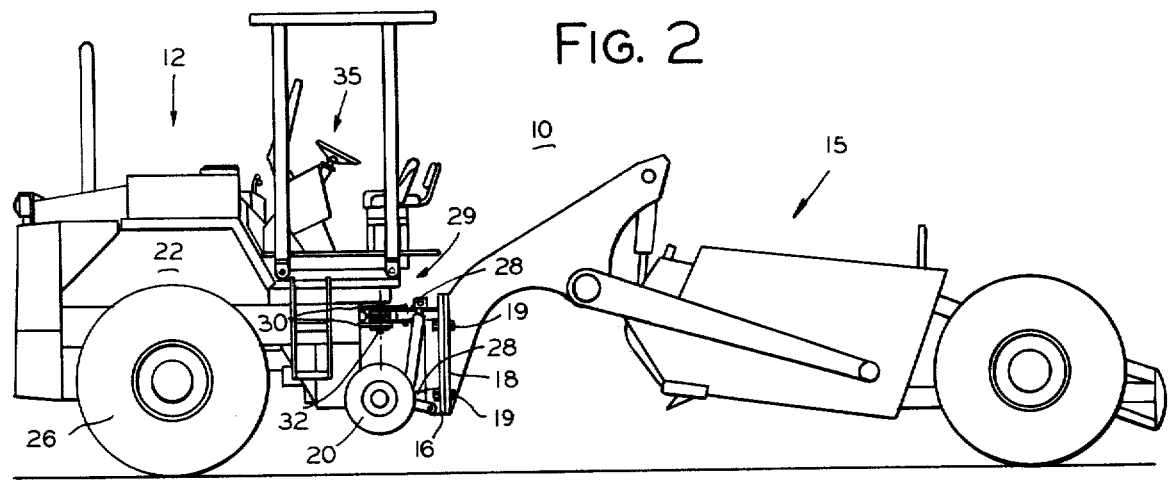
FIG. 2 shows another type of articulated vehicle embodying the same tractor unit.
Figure 3:
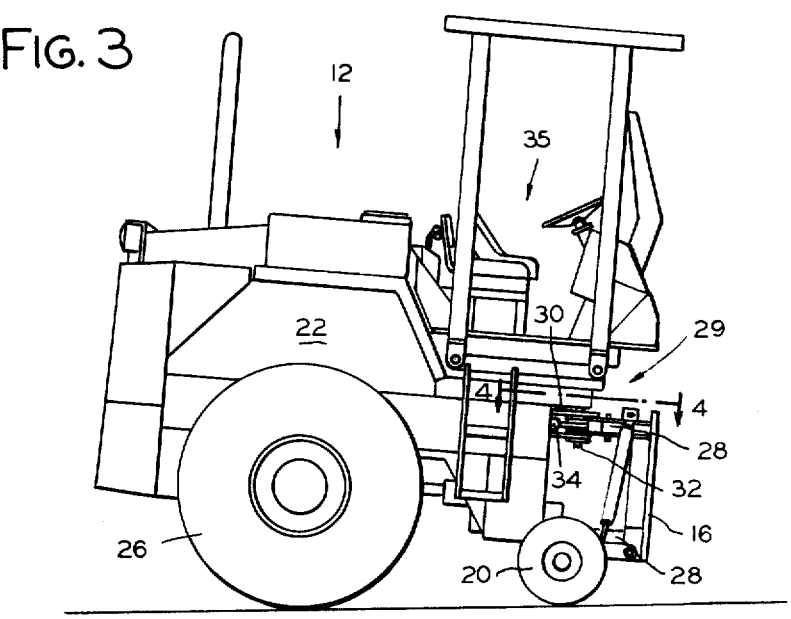
FIG. 3 is a view of the tractor unit only, with the auxiliary wheels lowered.

FIG. 3 shows the tractor unit detached from any implement unit, and when thus detached it is supported on auxiliary wheels 20. The auxiliary wheels 20 may be utilized to maneuver the tractor unit for connection to an implement unit but after such connection has been accomplished the auxiliary wheels 20 are then retracted as illustrated in FIG. 1 and also in FIG. 2. For a more detailed explanation of the manner in which the auxiliary wheels are utilized reference can be had to the said U.S. Pat. No. 3,563,329.

FIG. 2 of the drawing shows a complete vehicle which is composed of the same tractor unit 12 coupled to a different implement unit which is indicated by the numeral 15. Unit 15 is a scraper mechanism, and when it is coupled to the tractor 12 as shown in FIG. 2 the result is a self-propelled articulated scraper vehicle which may be utilized for the movement of dirt and other materials. For use with a scraper unit the operator's station 35 preferably is turned to face the other way, as shown. It will be understood that while only grader and scraper implements have been illustrated herein that bucket loaders, fork lifts, rollers and other implements may be utilized by attachment to tractor unit 12 to provide complete articulated self-propelled machines of the desired types.

As explained in the aforementioned patent, the connection portion 16 is pivotally connected to the main body portion 22 of the tractor unit 12 by means of a combined steering and draft coupling indicated generally by the numeral 29, which permits the portion 22 of the tractor to the left of centerline 24 to pivot about such centerline with respect to the remainder of the complete vehicle 10, or conversely. It is by such pivoting that the vehicle 10 is steered and the coupling 29 also acts as a portion of the frame structure of the vehicle, transmitting forces between the main body portion 22 and the remainder of the vehicle in both directions.

There are shown schematically in FIG. 3 brackets 28 which are rigidly secured to and project from the back of coupling plate 16. Two pairs of bifurcated brackets 30 (only one of which is visible in the drawing) are secured to the main body portion 22 of the tractor unit, and the pivot connection 29 is made by means of pins 32 which project through bifurcated brackets 30 and mating brackets 28.

Figure 4:
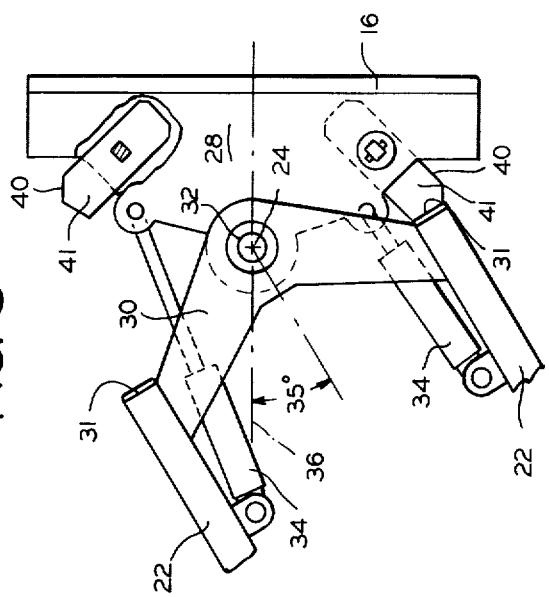
FIG. 4 is a schematic fragmentary view along the line 4—4 of FIG. 3, with some parts omitted to show the pivotal connection of this vehicle.
Figure 5:
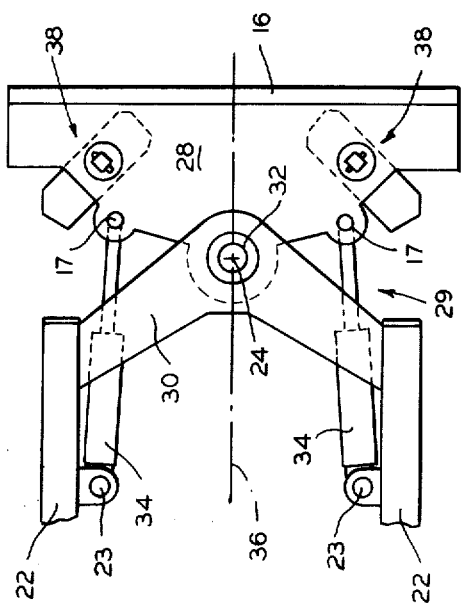
FIG. 5 is another view similar to FIG. 4 except illustrating the pivotal movement of the tractor unit to one selected limit.
Figure 6:
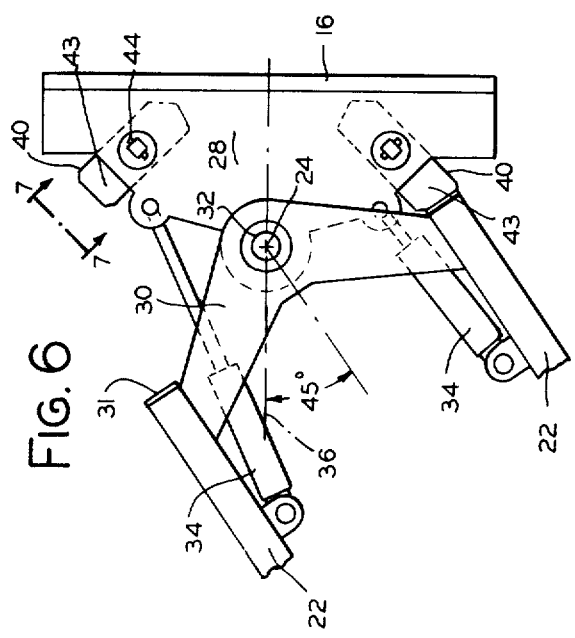
FIG. 6 is a view similar to FIG. 5 except showing the pivotal movement limited a different amount.

The coupling plate or connection portion 16 is pivoted about the vertically disposed axis 24, or conversely depending upon conditions, by means of linear hydraulic actuators 34 pivotally connected, at 23 on ech side (see FIG. 4), between the main body portion 22 and the connection portion 16 at 17. As shown in FIGS. 4, 5 and 6 of the drawing there is a steering actuator 34 adjacent each side of the machine; these are actuated in the usual manner by remote control by the operator in his station 35 to extend one and retract the other hydraulic actuator or vice versa in order to cause pivoting in the desired direction. It will be appreciated that such pivoting normally causes the portion 22 of the tractor unit to be pivoted with respect to the remainder of the vehicle in order to achieve steering. Although, it will also be understood as explained in the aforementioned U.S. patent that when the tractor unit 12 is disconnected from an implement unit and the auxiliary wheels 20 are in contact with the ground and in operation that the tractor unit 12 can be maneuvered by using the same pivot connection 29; in this case it is the connection portion 16 and the auxiliary wheels 20 carried thereby which pivot in order to accomplish steering.

It is desirable for the various types of vehicles or machines which can be made by utilizing a tractor unit such as tractor unit 12 to have different steering characteristics, and more particularly to be so arranged that it is not possible for the operator to pivot the portion 22 of the tractor unit more than a predetermined number of degrees relative to the remainder of the vehicle. For example, it may be desirable to limit the steering angle for a grader vehicle as illustrated in FIG. 1 to an angle of 35° to either side of the longitudinal centerline. On the other hand for a scraper vehicle as illustrated in FIG. 2, the desirable limit may be 45°.

FIG. 4 shows a view of the pivotal connection portion 29 of tractor unit 12 and the longitudinal centerline 36 when the vehicle is in a straight ahead position. To limit the pivoting of portion 22 of the vehicle with respect to the remainder of the vehicle, adjustable stop mechanisms indicated generally at 38 in FIG. 4 are provided on upper bracket 28, being located between upper and lower parts 28a and 28b of the bracket as shown in FIG. 7.

Figure 7:
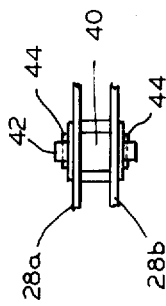
FIG. 7 shows details of the pivot angle adjustment mechanism.

FIG. 5, whch has a portion of part 28a of bracket 28 broken away illustrates in greater detail the adjustable stop mechanism which comprises a stop member 40 having a square opening 40a therethrough and a square pin 42 of slightly smaller dimensions which projects through stop 40 and also through parts 28a and 28b of bracket 28 above and below stop member 40 as shown in FIG. 7. Pin 40 is detachably secured in the operating position by means of small pins 44 which are illustrated in FIG. 7.

Figure 8:
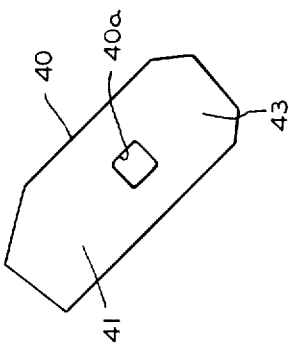
FIG. 8 is an enlarged view of a stop member.

FIG. 8 of the drawing shows a stop 40 which is the same as the upper stop 40 in FIGS. 4 and 5 except on an enlarged scale. It will be observed that such stop 40 has a portion 41 on one side of opening 40a which is of greater length than portion 43 on the other side of opening 40a. In FIGS. 4 and 5 the stops 40 are located in bracket 28 in positions in which the portions 41 project outwardly from bracket 28.

As shown in FIG. 5, the lower stop 40, and more specifically portion 41 thereof, limits the pivoting of the main portion 22 of the tractor unit to an angle of 35° from the longitudinal centerline because when that angle is reached stop 40 contacts main body portion 22 at location 31, the portion 22 thus serving as an abutment to prevent further pivoting. This is suitable for the grader vehicle of FIG. 1.

If a different maximum pivot angle is desired, such as 45°, for the scraper vehicle in FIG. 2, the stop members 40 are removed by removing pins 44 and then pin 42, and reversed, and pin 42 and pins 44 replaced, so that stops 40 are in the positions illustrated in FIG. 6 with portions 43 thereof projecting and the maximum angle when stop 40 engages the abutment 31 is 45°.

While an adjustable stop is described and illustrated herein which has two positions, it will be appreciated that it is possible to devise a stop which will have three or four or more positions if necessary in order to provide for a greater number of steering limits to accommodate various types of vehicles and machines of which tractor unit 12 may form a part.

It will be appreciated also that while the adjustable stop mechanisms have been described and illustrated herein as located on the connection portion and the abutments which they contact on the main body portion that it is possible to reverse this relationship and have similar stop mechanisms on the body portion and arranged to contact abutments on the connection portion. Thus, it will be appreciated that modifications may be made in this invention and it should be understood that I intend to cover by the appended claims all such modifications falling within the true spirit and scope of my invention.

What is claimed is:

1. A tractor unit for a vehicle comprising a body portion, a pair of drive wheels supporting the said body portion, a connection portion located at one end of the said body portion and having a pivotal connection about a vertically disposed axis to the body portion, retractable auxiliary wheels on the connection portion for partially supporting the tractor unit when it is not coupled to an implement unit, means on the said connection portion for detachably connecting an implement unit to the said tractor unit, and thus by virtue of the said pivotal connection forming an articulated vehicle, and continuously effective means for selectively providing different maximum angles of articulation for such vehicle as required for various implement units, the said means comprising stop members carried by one of the said portions and arranged to contact rigid abutments on the other said portion to limit the pivotal movement between the said portions, means for adjusting the said stop members to different positions whereby to limit the said pivotal movement to different predetermined angles from the straight ahead position, and each said stop member comprising a rigid structure detachably but rigidly secured to the said one portion.

2. A tractor unit for a vehicle as specified in claim 1 in which the said stop members are mounted on the said connection portion and the abutments are on the said body portion.

3. A tractor unit for a vehicle as specified in claim 1 in which the said stop members are mounted on the said body portion and the said abutments are on the said connection portion.

* * * * *